United States Patent [19]

Hayasaki

[11] Patent Number: 5,012,698

[45] Date of Patent: May 7, 1991

[54] RANGE SELECTION CONTROL ARRANGEMENT FOR AUTOMATIC AUTOMOTIVE TRANSMISSION

[75] Inventor: Koichi Hayasaki, Fujisawa, Japan

[73] Assignee: Nissan Motor Co., Ltd., Yokohama, Japan

[21] Appl. No.: 533,311

[22] Filed: Jun. 5, 1990

[30] Foreign Application Priority Data

Jun. 13, 1989 [JP] Japan .................................. 1-149871

[51] Int. Cl.⁵ .............................................. B60K 41/18
[52] U.S. Cl. ........................................ 74/866; 74/867
[58] Field of Search .................................. 74/866, 867

[56] References Cited

U.S. PATENT DOCUMENTS

| | | | |
|---|---|---|---|
| 4,406,181 | 9/1983 | Kubo et al. | 74/867 X |
| 4,736,813 | 4/1988 | Hayamae et al. | 74/866 X |
| 4,753,134 | 6/1988 | Hayasaki | 74/866 |
| 4,770,066 | 9/1988 | Hayasaki et al. | 74/867 |
| 4,817,472 | 4/1989 | Kinbo et al. | 74/867 X |
| 4,846,020 | 7/1989 | Kondo et al. | 74/866 |

Primary Examiner—Dirk Wright
Attorney, Agent, or Firm—Pennie & Edmonds

[57] ABSTRACT

The select lever is arranged to be movable only to the manual II position which reduces the stroke of the lever, and downshifting to first speed to obtain strong engine braking is enabled by a button operated first speed switch which is mounted on the select lever console. After the select lever is set in an engine braking position and the first speed switch is operated, upon the vehicle speed falling to a suitable level the transmission is permitted to downshift to first.

6 Claims, 6 Drawing Sheets

| GEAR \ FRICTION ELEMENT | R/C | H/C | F/C | B/B | L&R/B |
|---|---|---|---|---|---|
| REVERSE | ○ | | | | ○ |
| FORWARD FIRST | | | ○ | | |
| FORWARD SECOND | | | ○ | ○ | |
| FORWARD THIRD | | ○ | ○ | | |
| FORWARD FOURTH | | ○ | ○ | ○ | |

FIG. 7

| OVERALL GEAR RATIO | MAIN GEAR UNIT GEAR RATIO | AUXILIARY GEAR UNIT RATIO |
|---|---|---|
| FIRST | FIRST | REDUCTION |
| SECOND | SECOND | REDUCTION |
| THIRD | THIRD | REDUCTION |
| FOURTH | THIRD | DIRECT |
| FIFTH | FOURTH | DIRECT |

FIG. 8

| GEAR | SOLENOID 1 | SOLENOID 2 | SOLENOID 3 |
|---|---|---|---|
| FIRST | ON | ON | ON |
| SECOND | OFF | ON | ON |
| THIRD | OFF | OFF | ON |
| FOURTH | OFF | OFF | OFF |
| FIFTH | ON | OFF | OFF |

RANGE SELECTION CONTROL ARRANGEMENT FOR AUTOMATIC AUTOMOTIVE TRANSMISSION

BACKGROUND OF THE INVENTION

1. Field of the Invention

The present invention relates generally to an automatic automotive transmission and more specifically to a range selection control arrangement for such a transmission.

2. Description of the Prior Art

JP-A-62-62047 discloses a transmission which includes a power train comprising two planetary gear units which are operated by plurality of clutches and brakes. Depending on the engagement/disengagement of the various friction elements a plurality of forward speed can be selectively produced.

JP-A-61-244957 discloses an auxiliary gear unit which can be connected to the output shaft of a gear train of the type mentioned above for the purposes of increasing the number of forward speeds which can be produced.

The JP-A-62-62047 type transmission is capable of producing four forward speeds while the auxiliary gear unit can be produce two different gear ratios. Accordingly the combination of the main and auxiliary gear trains are capable of producing a total of 8 gear ratios. 5 of these gear ratios can be selected without encountering abnormal amounts of shift shock.

However, with this type of arrangement in the event that the select level is manipulated it is possible to limit the number of gear ratios between which shifting can occur.

In the case of the four speed transmission, the select lever can be moved between parking (P), reverse (R), neutral (N), drive (D), manual 2 (II) and manual 1 (I). The select lever is further provided with a overdirve (OD) inhibit switch which enables the transmission from being inhibited from shifting into fourth speed.

In the case of the provision of the auxiliary gear unit, fifth speed becomes the overdrive range and a manual 3 range (III) is added to the positions in which the select lever can be set.

In addition, in the case of the five speed transmission, the manual ranges in which engine braking can be induced are predetermined.

However, with this type of transmission the manual ranges are P, R, N, D, III, II and I. Viz., there are three forward ranges which can be selected. In order to induce engine braking the select level is permitted to be freely moved from D range to manual 2 range (II). In order to prevent excessive engine braking which can result in damage to the transmission or associated power train, the select lever is normally prevented from moving directly into manual first range (I).

Further, due to the increased number of selectable positions—viz., P, R, N, D, III, II & 1, the stroke of the select lever is increased to the degree that layout problems are induced. That is to say, the ergonomic dispositioning of the select lever with respect to the hand brake lever, the center arm rest and the consoles located between the hump on which the floor shift is mounted and the dashpanel, becomes difficult.

SUMMARY OF THE PRESENT INVENTION

It is an object of the present invention to provide a shift control arrangement which enables the stroke of the select lever to be reduced to a value which enable the ready disposition of the same in a floor shift console and which enables the selective downshifting to first gear to achieve strong engine braking upon demand.

In brief, the above object is achieved by an arrangement wherein the select lever is arranged to movable only to the manual II position which reduces the stroke of the lever and downshifting to first speed to obtain strong engine braking is enabled by a button operated first speed switch which is mounted on the select lever console. After the select lever is set in an engine braking position and the first speed switch is operated, upon the vehicle speed falling to a suitable level the transmission is permitted to downshift to first.

More specifically, a first aspect of the present invention comes in the form of an automatic automotive transmission which features: a gear train capable of producing a plurality of forward speeds; a select lever which is selectively movable between a plurality of forward speed range positions, said plurality of forward speed positions including at least one forward range position wherein the transmission is conditioned to produce engine braking, said select lever being arranged so that the lowest forward speed range it can be selectively moved to is a range wherein said transmission will produce the second lowest forward gear; and a lowest range switch; and means for permitting the transmission to downshift to the lowest forward speed when said lowest range switch is operated while said select lever is set in one of the forward range position wherein engine braking is induced and second lowest gear range position.

A second aspect of the present invention is an automatic automotive transmission which features: a gear train capable of producing a plurality of forward speeds, said plurality of forward speeds including a lowest forward speed; a select lever which is selectively movable between a plurality of forward speed range positions, said plurality of forward speed range positions excluding one which corresponds to the lowest forward speed which the transmission can produce, said plurality of forward speed positions including at least one forward range position wherein the transmission is conditioned to produce engine braking; and a lowest range switch; and means for permitting the transmission to downshift to the lowest forward speed when said lowest range switch is operated while said select lever is set in the forward range position wherein engine braking is induced.

A third aspect of the present invention comes in the form of an automatic automotive transmission which features; a gear train capable of producing a plurality of forward speeds, said plurality of forward speeds including a lowest forward speed; a select lever which is selectively movable between a plurality of forward speed range positions, the lowest of said plurality of forward speed ranges corresponding to the second lowest forward gear which the transmission can be conditioned to produce; means for sensing a parameter indicative of vehicle speed; a lowest range switch; and means for inhibiting the transmission from downshifting to the lowest forward speed until said lowest range switch is operated after said select lever is set in the lowest forward range position and the vehicle speed indicative parameter indicates a vehicle speed which is equal to or lower than a predetermined value.

Another aspect of the invention is deemed to come in the form of an automatic automotive transmission which features: a gear train capable of producing a plurality of forward speeds, said plurality of forward speeds including a lowest forward speed; a select lever which is selectively movable between a plurality of forward speed range positions, the lowest of said plurality of forward speed ranges corresponding to the second lowest forward gear which the transmission can be conditioned to produce, the second lowest of said plurality of forward speed ranges corresponding to the third lowest forward gear which the transmission can be conditioned to produce; means for sensing a parameter indicative of vehicle speed; a lowest range switch; and means for inhibiting the transmission from downshifting to the lowest forward speed until said lowest range switch is operated after said select lever is set in one of the lowest and second lowest forward range positions and the vehicle speed indicative parameter indicates a vehicle speed which is equal to or lower than a predetermined value.

DETAILED DESCRIPTION OF THE PREFERRED EMBODIMENTS

Figure 1:
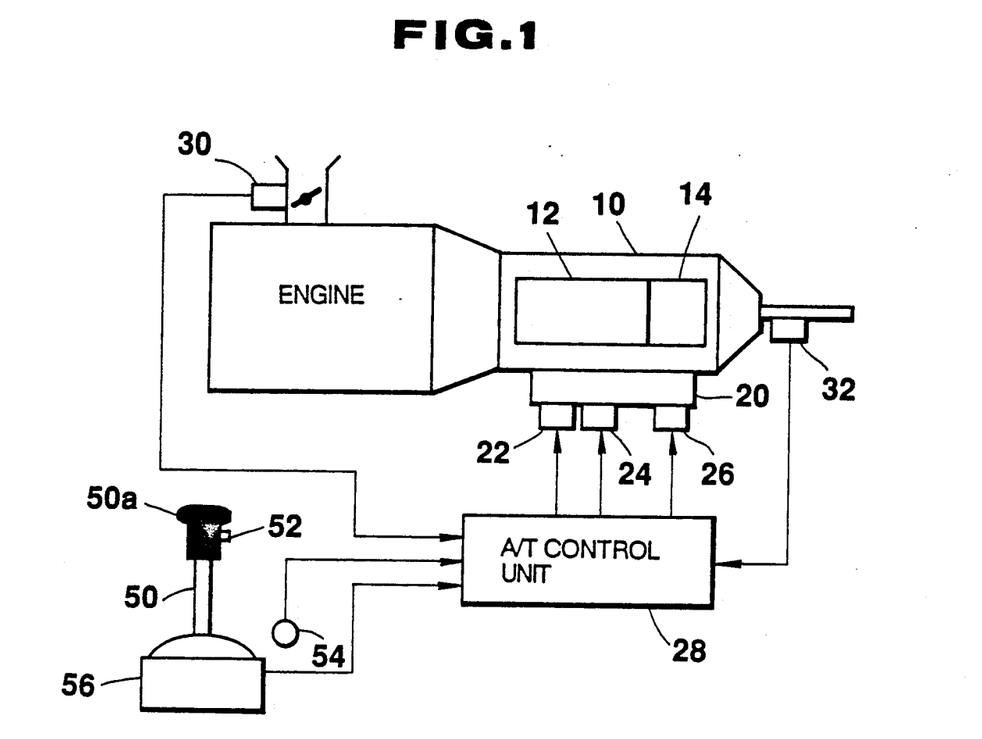
FIG. 1 is a schematic block diagram showing the conceptual arrangement of the present invention.

In FIG. 1 a transmission 10 is operatively connected with an engine and includes a main transmission gear train unit which is capable of producing four forward speeds and an auxiliary gear unit 14 which is capable of producing a reduction ratio and a direct drive ratio.

Figure 2:
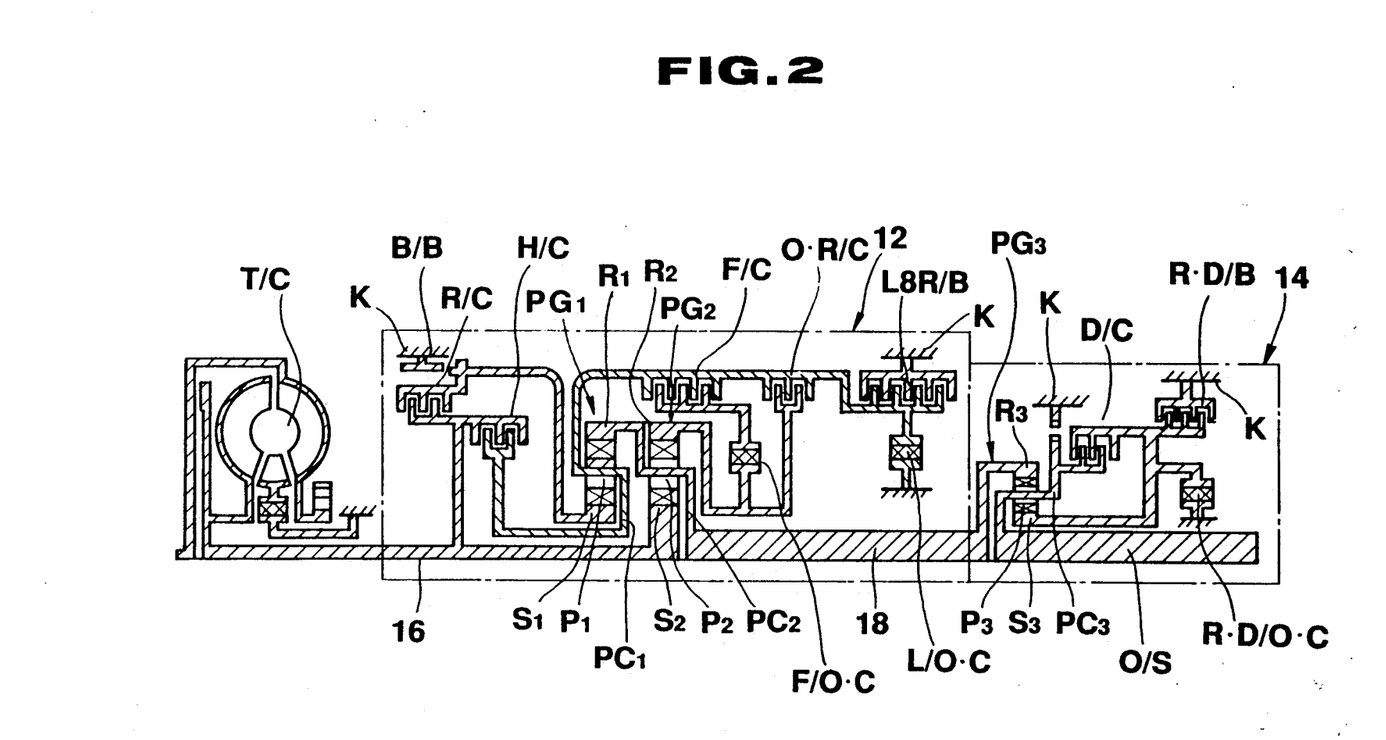
FIG. 2 is a sectional elevation showing the gear train of a transmission of the nature to which the present invention is applicable.

FIG. 2 shows details of the main and auxiliary gear train units 12 and 14. The main gear train 12 comprises first and second planetary gear units PG1 and PG2 while the auxiliary gear unit comprises a third planetary gear unit PG3.

The above mentioned first second and third planetary gear units PG1, PG2 and PG3 respectively include sun gears S1, S2 and S3, pinion gears P1, P2 and P3, ring gears R1, R2 and R3 and pinon carriers PC1, PC2 and PC3.

As best seen in FIG. 2 a transmission input shaft 16 is directly connected with the sun gear S2 of the second planetary gear set. This shaft is also selectively connectable with the sun gear S1 of the first planetary gear set by way of a reverse clutch R/C, and with the pinion carrier PC1 by way of a high clutch H/C. The first pinion carrier PC1 is selectively connectable with the ring gear R2 by way of a forward clutch F/C. The first sun gear S1 is selectively connectable with the transmission casing K by way of a band brake B/B, while the first pinion carrier PC1 is selectively connectable with said casing by way of a low and reverse brake L&R/B.

In addition to this, a forward one-way clutch F/O.C is operatively connected between the forward clutch F/C and the second ring gear R2, while the first pinion carrier PC1 is operatively connected with the casing K via a low one-way clutch L/O.C. Further, the pinion gear PC1 and the second ring gear R2 are operatively connected by the forward one-way clutch F/O.C. and an overrunning clutch O.R/C which are arranged in parallel.

The third planetary gear set PG3 of auxiliary gear unit 14 comprises a third pinion carrier PC3 includes a third planetary gear set PG3 which is selectively connectable with a third sun gear S3 by way of direct clutch D/C. The third sun gear S3 is selectively connectable with the casing K by way of a reduction brake R.D/B. A reduction one-way clutch R.D/O.C is connected between the third sun gear S3 and the casing K.

An intermediate shaft 18 (output shaft of the main gear unit) interconnects the second pinion carrier PC2 and a ring gear R3 (input element) of the auxiliary gear unit 14).

Figure 6:
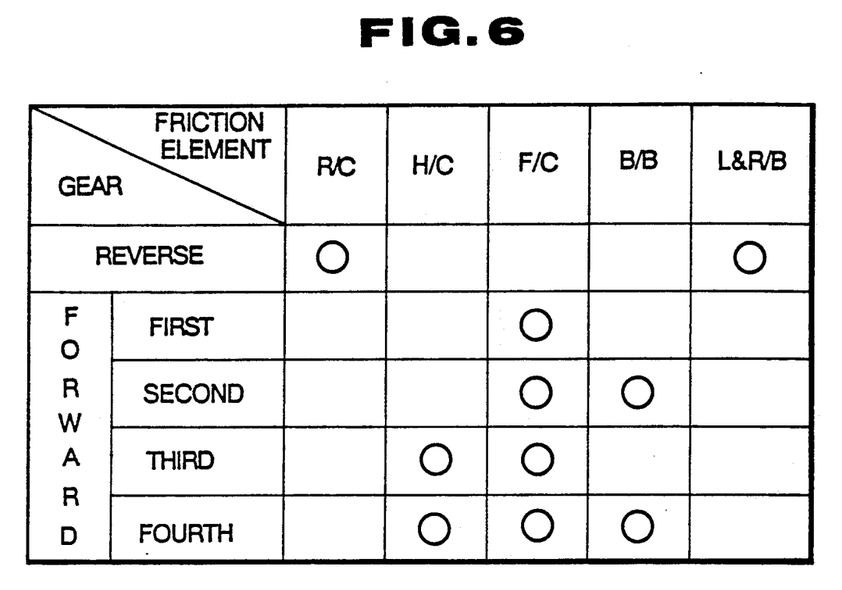
FIG. 6 is a table showing the friction element engagements which produce first to fourth forward and one reverse gears in the transmission shown in FIG. 2.

FIG. 6 shows the manner in which the selective engagement/disengagement of the friction elements R/C, H/C, F/C B/B and L&R/B conditions the main gear unit to produce one reverse and four forward gears. In this figure the circles denote friction elements which are engaged.

It should also be noted that the forward one-way clutch F/O.C permits the second ring gear R2 to rotate in a drive direction with respect to the first pinion carrier PC1 while lock and prevent the reverse relative rotation therebetween.

The low one-way clutch L/O.C. is arranged to permit the pinion carrier PC1 to rotate in the drive direction and to lock and prevent the reverse relative rotation.

It should be noted that the overrunning clutch O.R/C is such as to be engaged when the main gear unit is conditioned to produce first to third speeds and the accelerator pedal depression degree is less than 1/16. This negates the function of the forward clutch F/O.C and permits engine braking to take place.

On the other hand, the auxiliary gear unit 14 is arranged such that in response to the engagement of the direct clutch D/C the rotation of the output shaft O/S is the same as the input rotation. When the direct clutch D/C is released a reduction between the output and input rotational speeds occurs.

The reduction one-way clutch R.D/O.C is such as to permit the third sun gear S3 to rotate in the drive direction and lock and prevent rotation in the reverse direction.

Figure 7:
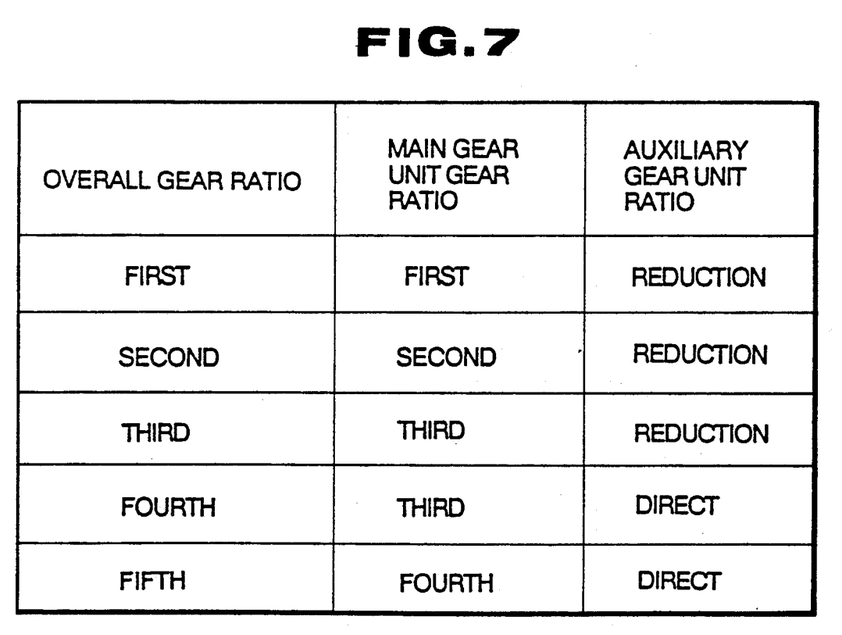
FIG. 7 is a table which shows the gear ratios which are produced by the main and auxiliary gear units and the resulting overall gear ratio produced by the transmission.

Thus, as will be understood, the auxiliary gear unit 14 is capable of being selectively switched between two different speeds. By combining this feature with the gear ratios produced by the main gear unit in the manner shown in FIG. 7 it is possible to selectively produce 5 forward speeds.

A control valve unit 20 which houses a plurality of spool valves and like via which hydraulic fluid under pressure is selectively supplied to the friction elements of the main gear unit 12, is provided with first second and third selectively energizable shift control solenoids 22, 24 and 26. Solenoids 22 and 24 are associated with the main gear unit and control the shifting between the first-fourth gear ratios which can be produced by the same. The third solenoid 26 is associated with the auxiliary gear unit 14.

Figure 8:
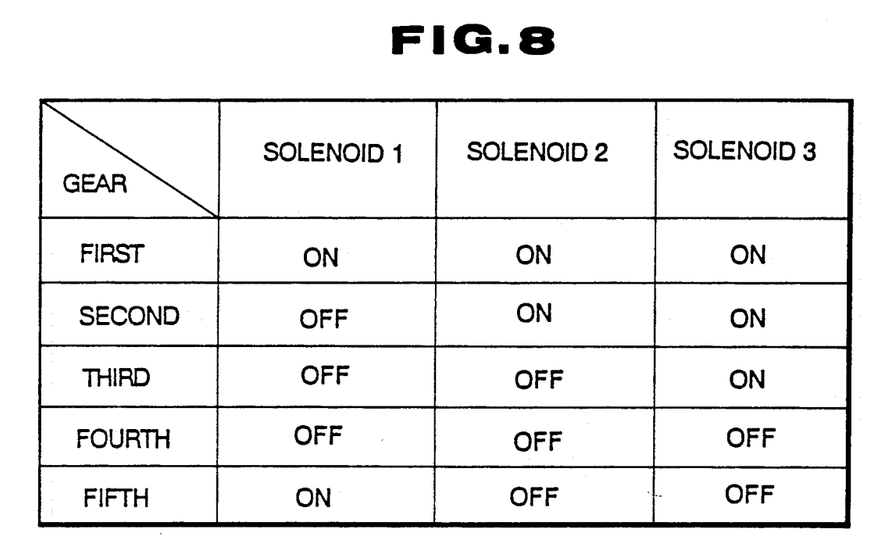
FIG. 8 is table which shows the energization patterns of three shift control solenoids which induce first to fifth gear ratios.

FIG. 8 shows the energization pattern of the three solenoids which condition the transmission as a whole to produce the above mentioned selected 5 forward speeds.

The solenoids are controlled by signal supplied from a A/T control unit 28. This unit as shown, is supplied with data input from an engine throttle position sensor 30 and a vehicle speed sensor 32. In accordance with a shift schedule which is recorded in a memory in the control unit, the unit determines on the basis of engine load and engine speed if a shift is necessary and which shift should be implemented.

In addition to the engine load and vehicle speed data, the A/T control unit is also supplied with a signal indicative of the position in which the select lever 50 is currently set in. The conditioning of the transmission is controlled in accordance with this "range" signal as it will be referred to hereinafter. That is to say, in the case of the above described five speed transmission, the select lever can be set in any one of P, R, N, D, III, II & I ranges. As is conventional, when the III range is selected, the transmission may shift between first and third speed, while in the event that II range is selected the transmission is prevented from upshifting beyond second speed. In the event that the I range is selected, the transmission is prevented from upshifting from first speed.

Figure 3:
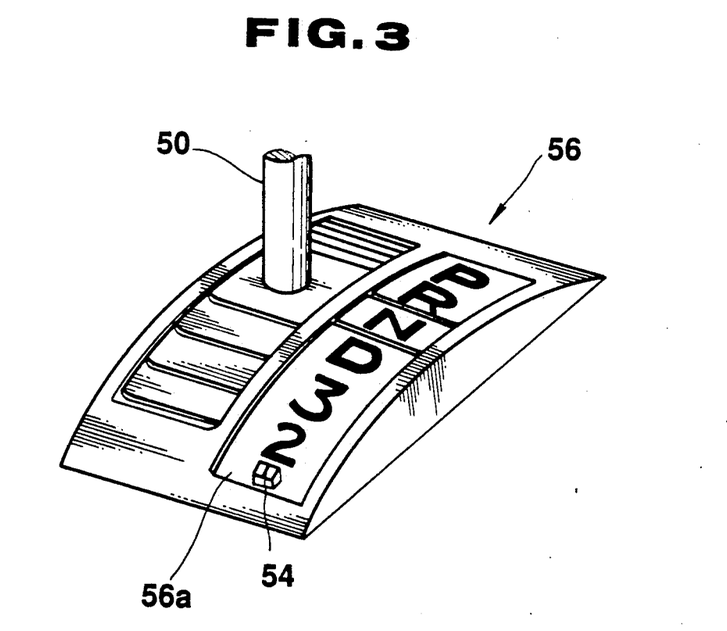
FIG. 3 is a perspective view showing a select lever arrangement according to the present invention.

The select lever knob 50a is provided with an OD (over drive) inhibit switch 52 which enables the drive to selectively inhibit the transmission from shifting into fifth speed during D range operation.

In accordance with the present invention the select lever arrangement 56 is arranged as shown in FIG. 3, so that the select lever 50 can be only moved between the P and II range positions, and a first range switch 54 is provided on the panel 56a on range positions are displayed, adjacent the II range position. In this embodiment, this switch takes the form of a push button type switch and is arranged to toggle between ON and OFF states. When operated to assume an ON state, the switch outputs a signal to the A/T control unit 28.

With the above described type of arrangement it is possible to manually move the select lever 50 from one range position to another, manually operate the OD inhibit switch 50 between ON and OFF positions and to press the first range switch 54 as desired. The construction, arrangement and operation of the OD inhibit switch, is the same as in the case of the arrangement disclosed in U.S. Pat. No. 4,730,521 filed on Mar. 15, 1988 in the name of Hayasaki et al. The contents of this document are hereby incorporated by reference.

Figure 4:
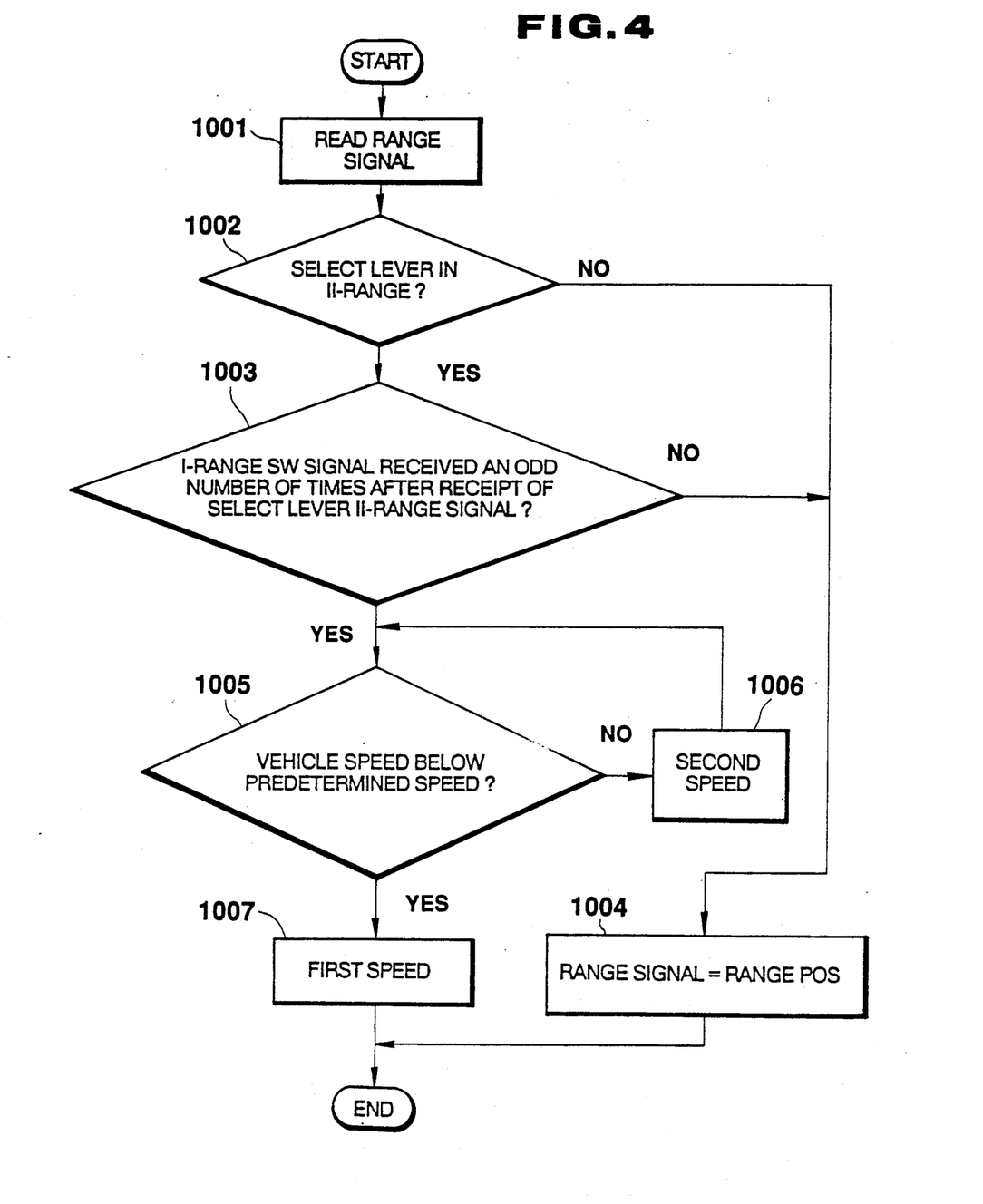
FIG. 4 is a flow chart showing the steps which characterize the operation of a first embodiment of the present invention.

FIG. 4 shows in flow chart form the steps which characterize the operation of a first embodiment of the present invention. As will be appreciated, the first step of the routine depicted in this figure is such as sample the range signal being produced by the select lever arrangement 56 and suitably set this in memory. Following this it is determined in step 1002 if the select lever position indicated in the sampling conducted in step 1001 indicates the select lever having been placed in II range or not. If the outcome affirms the lever having been detected in II range the routine proceeds to step 1003. However, in the case of a negative outcome, the routine flows to step 1004 wherein a command is used to recognize the position in which the select lever 50 is set as being the range which is required to produced by the transmission.

At step 1003 it is determined if the first range switch 54 has been pressed an odd number of times following the select lever having been moved into the II range position. In the event of a negative outcome (indicating a even number of button operations), it is assumed that an OFF state has been selected and that a downshift to first gear is not required. The routine therefore flows to step 1004.

On the other hand, if an odd number of depression is detected, then it is assumed that the first range switch 54 has been operated in a manner in a manner indicative of the driver's requirement for a downshift the transmissions lowest gear, and the routine flows to step 1005. At this step the output of the vehicle speed sensor 32 is sampled and the instant vehicle speed compared with a predetermined value. This value is selected to be one representative of a vehicle speed above which a downshift to first gear is apt to place an undue strain on the transmission and/or associated power train.

If the vehicle speed is not found to be below the predetermined speed, then the routine flows to step 1006 wherein a command to maintain second gear is issued. The 1005–1006 loop is maintained until such time as the vehicle speed lowers to the required degree. Upon the required speed requirements being met the routine is permitted to flow to step 1007 wherein a command to condition the transmission to produce first speed is issued.

Figure 5:
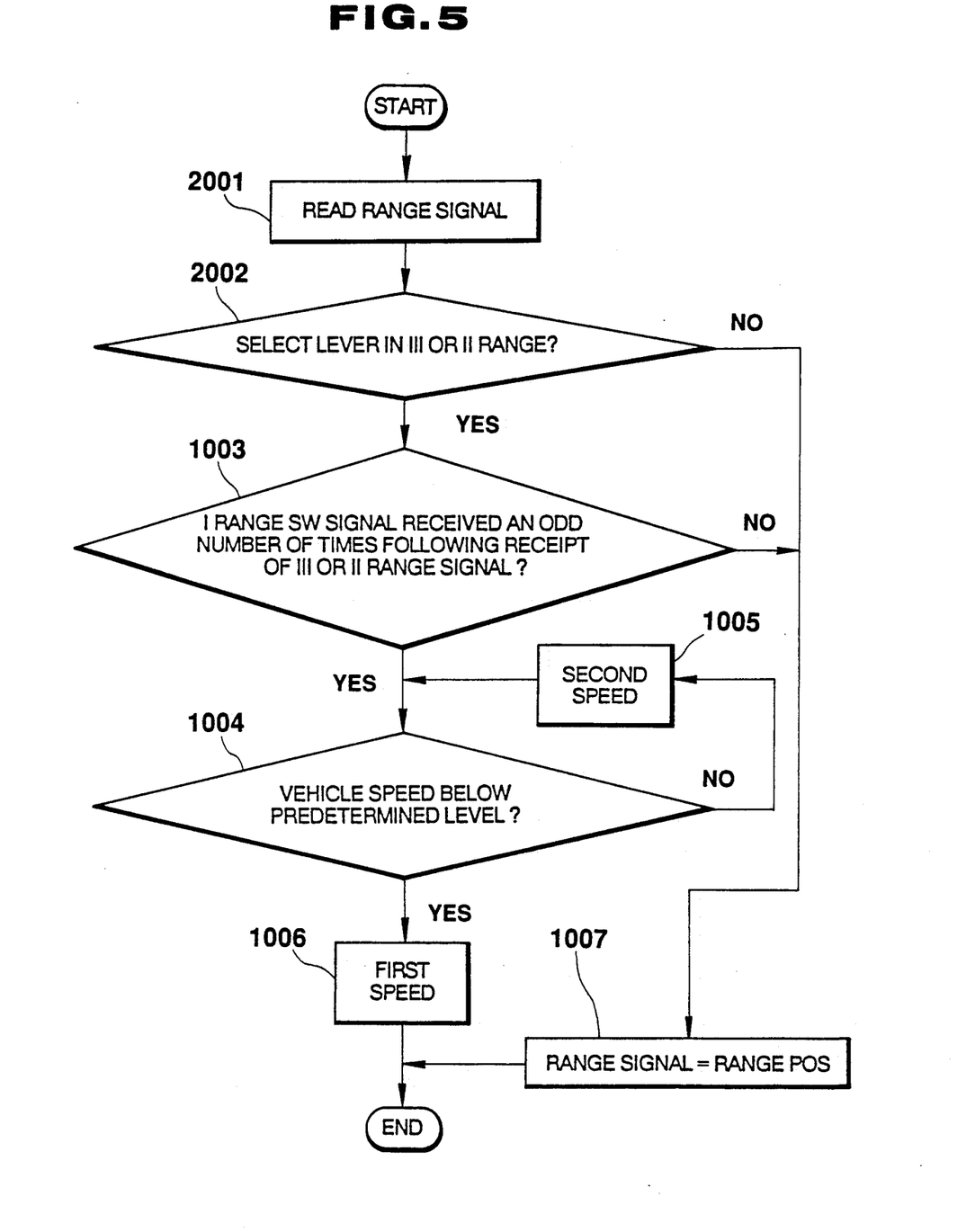
FIG. 5 is a flow chart showing the steps which characterize the operation of a second embodiment of the present invention.

FIG. 5 shows a routine which is implemented in accordance with a second embodiment of the present invention. In this embodiment rather than detecting the select lever 50 having been placed only in the II range position, the selection of either II or III ranges permits the routine to flow to step 1003 wherein the number of switch operations is examined.

The effect of this is such as to permit the driver to depress the first range switch 54 when the transmission select lever is set in either 50 III or II range positions. This is deemed advantageous in the case wherein the situation wherein a strong engine braking effect is suddenly demanded. By being able to depress the first range switch in III range, the danger the driver will be distracted by trying to push the switch 564 in an emergency situation or the like after having moved the select lever to the II range position, tends to be reduced. In other words, it is possible for the driver to anticipate the need for strong engine braking and press the first range switch after having shifted the select lever to III range position. According, if the demand for the anticipated engine braking actually arises, all the driver need do is shift the select lever 50 to the II range position. Upon the vehicle speed lowering sufficiently, the transmission will shift down into first gear.

This arrangement also makes in impossible for the transmission being conditioned to produce first gear if first range switch 54 to be pressed while the select lever 50 is in D range and the select lever is thereafter moved to the III or II range positions. Accordingly, the driver will not be surprised by an unexpected downshift into first gear should the select lever be set in a range wherein engine braking is induced.

If the select lever is moved back into D range after the transmission has been conditioned to produce first gear, the system is reset and the select lever 50 must be again set in one of II and III ranges and the first range switch 54 operated before a downshift to first gear can be induced.

Further, and more importantly, with the present invention, the stroke of the select lever is the same as in the case of a four speed transmission. Viz., the select lever is arranged to be movable between six different positions—P, R, N, D, 3(III) and 2(II)—and hence the angle through which the lever 50 can pivot is not increased as would the case in the event that the lever were to be movable into an additional first speed (I range) position.

What is claimed is:

1. In an automatic automotive transmission
   a gear train capable of producing a plurality of forward speeds;
   a select lever which is selectively movable between a plurality of forward speed range positions, said plurality of forward speed positions including at least one forward range position wherein the transmission is conditioned to produce engine braking, said select lever being arranged so that the lowest forward speed range it can be selectively moved to is a range wherein said transmission will produce the second lowest forward gear; and
   a lowest range switch; and
   means for permitting the transmission to downshift to the lowest forward speed when said lowest range switch is operated while said select lever is set in one of a forward range position wherein engine braking is induced and to produce the second lowest lowest gear.

2. In an automatic automotive transmission
   a gear train capable of producing a plurality of forward speeds, said plurality of forward speeds including a lowest forward speed;
   a select lever which is selectively movable between a plurality of forward speed range positions, said plurality of forward speed range positions excluding one which corresponds to the lowest forward speed which the transmission can produce, said plurality of forward speed positions including at least one forward range position wherein the transmission is conditioned to produce engine braking; and
   a lowest range switch; and
   means for permitting the transmission to downshift to the lowest forward speed when said lowest range switch is operated while said select lever is set in the forward range position wherein engine braking is induced.

3. A transmission as claimed in claim 2, wherein said gear train includes a main gear unit and an auxiliary gear unit, said main gear train being capable for producing four forward speeds, said auxiliary gear train being capable of producing producing a reduction gear and a direct drive gear.

4. A transmission as claimed in claim 2 wherein said select lever projects from a housing, said lowest range switch being mounted on said housing adjacent the position the select lever assumes when it is in said at least one forward range position wherein the transmission is conditioned to produce engine braking.

5. In an automatic automotive transmission
   a gear train capable of producing a plurality of forward speeds, said plurality of forward speeds including a lowest forward speed;
   a select lever which is selectively movable between a plurality of forward speed range positions, the lowest of said plurality of forward speed ranges corresponding to the second lowest forward gear which the transmission can be conditioned to produce;
   means for sensing a parameter indicative of vehicle speed;
   a lowest range switch; and
   means for inhibiting the transmission from downshifting to the lowest forward speed until said lowest range switch is operated after said select lever is set in the lowest forward range position and the vehicle speed indicative parameter indicates a vehicle speed which is equal to or lower than a predetermined value.

6. In an automatic automotive transmission
   a gear train capable of producing a plurality of forward speeds, said plurality of forward speeds including a lowest forward speed;
   a select lever which is selectively movable between a plurality of forward speed range positions, the lowest of said plurality of forward speed ranges corresponding to the second lowest forward gear which the transmission can be conditioned to produce, the second lowest of said plurality of forward speed ranges corresponding to the third lowest forward gear which the transmission can be conditioned to produce;
   means for sensing a parameter indicative of vehicle speed;
   a lowest range switch; and
   means for inhibiting the transmission from downshifting to the lowest forward speed until said lowest range switch is operated after said select lever is set in one of the lowest and second lowest forward range positions and the vehicle speed indicative parameter indicates a vehicle speed which is equal to or lower than a predetermined value.

* * * * *